Patented June 23, 1942

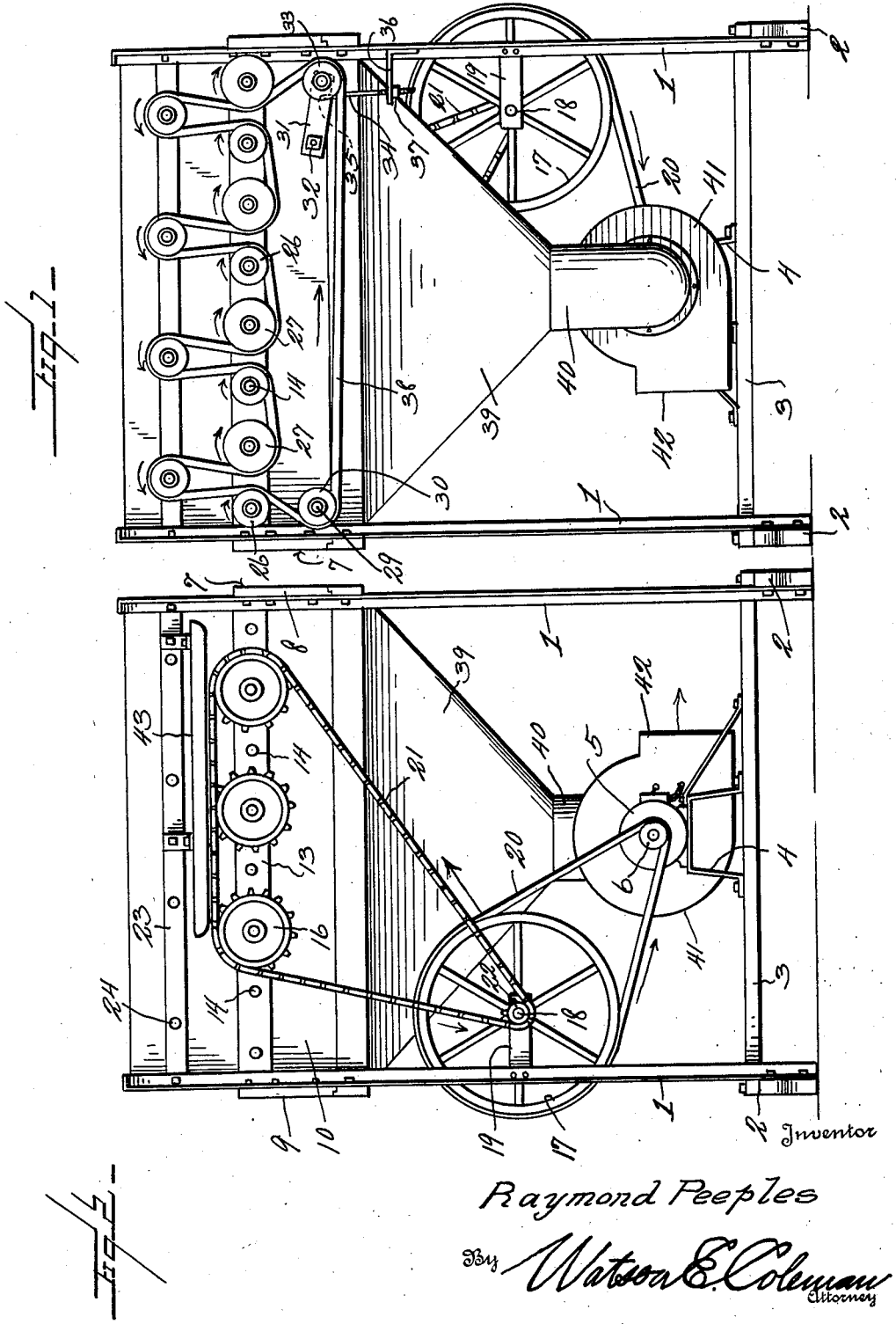

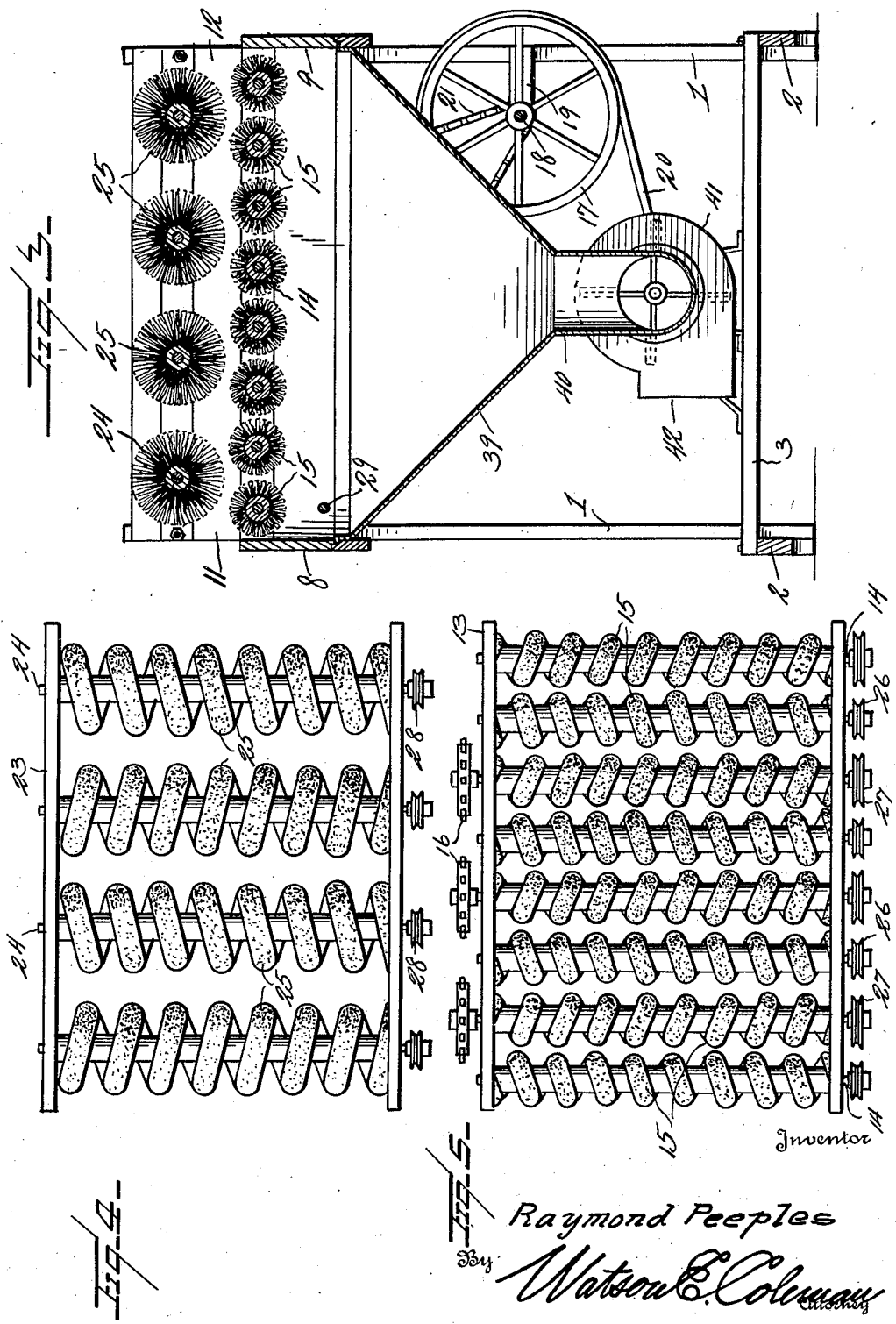

2,287,447

UNITED STATES PATENT OFFICE 2,287,447

CLEANING MEANS FOR FRUITS, VEGETABLES, ETC.

Raymond Peeples, Palisade, Colo.

Application December 12, 1940, Serial No. 369,899

3 Claims. (Cl. 146—202)

This invention relates generally to improvements in machines for cleaning or brushing fruits, vegetables or other commodities and has for its primary object to provide a machine which is particularly adapted for the handling and brushing of peaches to effect the removal of the fuzz therefrom.

A primary object of the present invention to provide a brushing machine of the character stated which is so designed that it will handle peaches and other tender fruit without bruising or injuring the same and will, at the same time, effectively brush the entire body of the fruit and move the fruit through from an inlet to an outlet side.

Another object of the invention is to provide a machine for brush cleaning peaches or other fruit and vegetables which is constructed in a novel manner to effect the relatively slow turning of the fruit by certain of the brushes while the fruit is being thoroughly brushed or cleaned by other ones of the brushes, so that the fruit will be brushed all around to effect the complete removal of fuzz or other adhering material and will come out of the machine in a bright and attractive form.

Still another object of the invention is to provide a fruit and vegetable brushing machine in which there are employed upper and lower groups of parallel spiral brushes between which the fruit or vegetable passes along a path transversely of the long axes of the brushes and in which a driving means is provided for the brushes of the upper and lower groups which is so organized and controlled that certain of the brushes of the lower group, while being all of the same diameter, will be rotated at a different speed from those of the other brushes of that group and at a different speed from the brushes of the upper group, as a result of which the fruit or vegetables will advance through the machine in steps or will have intermittent movement so as to effect the turning and the temporary retarding of the fruit while the upper brushes are working thereon.

Still another object is to provide in a machine of the character stated, a novel arrangement of the spiral brushes whereby the fruit will be prevented, in passing through the machine, from working into groups at one or the other sides of the machine, as a result of which the fruit will pass through in spread-out condition so as to be most effectively cleaned.

The invention will be best understood from a consideration of the following detailed description taken in connection with the accompanying drawings forming part of this specification, with the understanding, however, that the invention is not to be confined to any strict conformity with the showing of the drawings but may be changed or modified so long as such changes or modifications mark no material departure from the salient features of the invention as expressed in the appended claims.

In the drawings:

Fig. 1 is a view in side elevation of the machine showing the driving connections between the brush pulleys.

Fig. 2 is a view in elevation of the opposite side of the machine from Fig. 1, showing the driving connections between certain of the brushes of one group and the power means by which the brushes are operated.

Fig. 3 is a vertical sectional view through the machine taken on a plane perpendicular to the axis of rotation for the brushes.

Fig. 4 is a view in top plan of the upper brush group.

Fig. 5 is a view in top plan of the lower brush group.

Referring now more particularly to the drawings, it will be seen that the machine embodying the present invention has a supporting frame of suitable design, the same being here shown as including vertical corner posts 1, which at their lower ends are secured to bases or feet 2, which are in the form of rails which extend transversely of the machine, and these bases or feet 2 are connected by a relatively wide base plate 3 on which is mounted a motor supporting bracket 4. Upon this bracket 4 is mounted an electric motor 5 having upon one end of its armature shaft, a driving pulley 6.

At their upper ends the corner posts of the frame support a box which is indicated generally by the numeral 7 and in which fuzz and other material removed from the fruit and vegetables is collected. This box comprises the front and rear end walls 8 and 9, respectively, and the side walls 10 and, as is clearly shown, the side walls extend upwardly a substantial distance beyond the top edges of the end walls so that there are provided the entrance and exit openings 11 and 12, respectively.

The side walls support on their outer faces bearing bars 13 and extending through the box from one side to the other and having their ends rotatably supported in these bearing bars, are shafts 14 which are in parallel relation as shown, and which support within the box the spiral brushes 15. As will be seen, these spiral brushes form a group lying in a common plane and they are arranged so that the tops of the brushes extend only slightly above the top edges of the end walls of the box. It will also be noted that the brushes at the end of the group are in relatively close proximity to the adjacent end walls and that all of the brushes are in sufficiently close proximity to one another so that when a fruit, such as a peach, passes over the front end wall 8 from a conveyor, not shown, it will move directly onto the top of the first brush and cannot fall down between the brush and the end wall nor can it fall down between the brushes as it passes over the first brush toward the second one.

These spiral brushes are arranged as is shown in Fig. 4, so that alternate ones will be of one hand, as for example, they will have the spiral to the right or clockwise, while the other and intermediate brushes will be of the opposite or left hand. By this arrangement the fruit or vegetables as they pass through the machine will be prevented from working toward one side of the machine and will be kept spread out through the width of the machine so they can be effectively cleaned.

Certain of the shafts 14 carrying the lower group of spiral brushes have upon one end thereof sprocket gears 16, the gears all being, of course, upon one side of the machine as shown in Fig. 2. Three of such gears are here shown and they are shown as being mounted upon alternate brushes so that the shaft for the second, fourth and sixth brush carries a wheel, but it is to be understood, of course, that any other disposition of the sprocket gears may be made so long as the proper driving of the brushes is accomplished. Connection is made between the driving motor 5 and the sprocket gears 16 through the medium of the pulley wheel 17, which has a shaft 18 which is rotatably supported upon a stub bracket 19 attached to the frame, and the driving belt 20 and sprocket chain 21. The belt 20 connects the pulley wheel 6 of the motor shaft with the larger wheel 17 and the sprocket chain 21 passes over the three sprocket gears in the manner shown and around a small sprocket gear 22, which is keyed to the shaft 18 upon which the wheel 17 is mounted.

Above the bearing bars 13 there are mounted upon the side walls of the box other bearing bars 23 and these bars have rotatably supported therein the ends of shafts 24 which extend across the upper part of the box 7 and each of which supports a spiral brush 25 which is of materially greater diameter than the brushes 15. The shafts 24 upon which the upper and larger spiral brushes 25 are mounted, are arranged to lie in a vertical plane which passes between a pair of the lower brushes 15, as will be seen upon reference to Figs. 4 and 5, where the brushes of the upper and lower groups are disposed in their proper relative order with the exception that they are both here shown as being in side by side relation instead of one above the other. These larger upper brushes are also arranged so that the spirals are alternate, the first brush, which is the brush at the entrance end of the box, having a left-hand spiral as viewed from above, the next brush being of a right-hand spiral.

Upon the side of the machine opposite from the side upon which the sprocket gears 16 are located, a driving connection is established between the shafts of the brushes of the upper and lower groups whereby the brushes of one group will all revolve in one direction and will also revolve in a direction opposite to the direction of revolution of the other group. By means of this driving arrangement also there is obtained a novel action which effects the alternate rapid and slow advancing of the fruit or vegetables through the machine as a result of which such fruit or vegetable is rotated and is at the same time made to periodically slow up in its movement so that it may be thoroughly brushed or cleaned by the upper rotating spiral brushes 25. This driving of the brushes in the manner stated is accomplished in the following manner. The shafts 14 are provided with the alternate large and small pulley wheels 26 and 27, the shaft for the first brush having a small pulley wheel, as shown. The shafts 24 for the upper and larger brushes are provided with pulley wheels 28 which are all of the same size and are preferably of approximately the same size as the smaller wheels 26 of the lower brush group.

At the front end of the machine there is supported upon a shaft 29 which extends transversely of the box below the first one of the brushes of the lower group, an idler pulley 30.

Adjacent the rear of the machine there is mounted upon the side wall adjacent which the pulleys are located, a plate or bracket 31 which is supported by a bolt 32, so that it may rock vertically on an axis extending transversely of the machine. This bracket 31 supports an idler 33 and this idler pulley functions as a belt tightener when the bracket 31 is drawn downwardly away from the overlying groups of pulleys. A suitable means is provided for pulling the bracket 31 downwardly as desired, in the form of a threaded rod 34 which has one end pivotally connected with the bracket 31, as at 35, between the pivot 32 for the bracket and the pulley 33, and the lower end of this threaded rod 34 passes through a fixed bracket 36 which is secured to the adjacent post 1 of the frame and has threaded thereon a nut 37 which bears against the under side of the fixed bracket 36. By shifting this nut 37 on the threaded rod relative to the first bracket 36, the belt tightener pulley may be raised or lowered, as desired.

The pulleys of the upper and lower groups of brushes are all operatively coupled together and with the two idlers 30 and 33, by a single belt 38.

As is clearly shown in Fig. 1, this belt passes across the rear side of the first pulley 26, then up and over the first one of the pulleys 28 of the upper group and back down across the forward side of the second pulley of the lower brush group which is a pulley of larger diameter, and then from the under side of this second pulley across the under side of the third pulley of the lower brush group and around the rear side thereof and upwardly and over the second pulley of the upper brush group and so on, finally passing down, around and under the tightener pulley 33 and back to the idler 30. With this belt arrangement coupling the pulleys of the upper and lower brush groups and by providing the pulleys of the lower brush group alternately of small and large diameter, the desired improved brushing action, previously described, is obtained. Since the first brush of the lower group turns clockwise and the spiral is of the right-hand order and the first brush of the upper group turns counter-clockwise, it will be readily apparent that as the fruit is fed toward the inlet 11 by a suitable conveyor, it will be picked up by the smaller brush and moved inwardly between the brushes, but as it reaches the second one of the smaller brushes of the lower group, its movement will be somewhat retarded due to the fact that this second brush will be rotating at a slower speed than the first brush, and this will give the second brush an opportunity to thoroughly brush the fruit in cooperation with the first upper brush 25.

In order that the fuzz and other material removed from the fruits or vegetables may be effectively carried off, the lower part of the box 7 is made in the form of a downwardly tapering hopper 39 which leads the brushed off material by way of the pipe 40 to the inlet side of a blower 41. The fan, which forms a part of this blower, is coupled with the motor 5, so that the blower can be operated off of this motor as well as the brushes, and material entering the housing may then be discharged through the outlet 42 of the housing to a suitable carry-off pipe or receiver. Upon the side of the box where the sprocket gears 16 are located, a guard or shield 43 is provided which extends lengthwise of the box and covers the gears and the portion of the chain passing over the tops of the gears. This will prevent the accidental tangling of clothing with the chain and wheels.

What is claimed is:

1. A brushing machine of the character described, comprising a group of spiral brushes disposed in relatively close parallel relation in a common plane, said brushes being rotatably supported and being all of the same diameter, a second group of spiral brushes disposed in relatively close parallel relation in a common plane above and in relatively close relation to the first brushes, the planes of the two groups of brushes being parallel and the brushes of the second group being rotatably supported, pulley members connected with the brushes of the first group, pulley members connected with the brushes of the second group, the pulley members of the first group being alternately of small and large diameter, and a driving connection between and common to all of the pulleys of the two groups and arranged to rotate all of the brushes of the first group in one direction and to rotate all of the brushes of the second group in one direction and oppositely to the direction of rotation of the brushes of the first group.

2. A fruit brushing machine, comprising a box having a bottom outlet and having front and rear end walls and side walls, a plurality of elongated spiral brushes extending transversely of the box and forming a lower group in a common plane, said brushes being of substantially the same diameter and in relatively closely spaced relation, means forming fruit inlet and outlet openings at the front and rear ends of the box for the discharge of fruit into and out of the box in the plane of the tops of the brushes, said brushes having the spirals thereof alternately of right and left-hand order, a second group of brushes lying above the first group and comprising a plurality of elongated spiral brush members of larger diameter than the brush members of the first group and each disposed with its longitudinal axis lying in a vertical plane passing between a pair of brushes of the first group, the spirals of the brushes of the second group being alternately of opposite hand, the brushes of said groups being supported for rotation, a driving pulley operatively connected with each of the brushes of each group, said driving pulleys all being disposed upon one side of the box, alternate ones of the driving pulleys for the brushes of the first group being of different diameter from the remaining pulleys of the same group, a single driving belt operatively connected with all of the said pulleys of the two groups to effect the rotation of all of the brushes of the first group in one direction and the rotation of all of the brushes of the second group in one direction and oppositely to the brushes of the first group, and means for applying rotary power to one of the brushes of one of said groups.

3. A fruit brushing machine, comprising a box having a bottom outlet and having front and rear end walls and side walls, a plurality of elongated spiral brushes extending transversely of the box and forming a lower group in a common plane, said brushes being of substantially the same diameter and in relatively closely spaced relation, means forming fruit inlet and outlet openings at the front and rear ends of the box for the discharge of fruit into and out of the box in the plane of the tops of the brushes, said brushes having the spirals thereof alternately of right and left-hand order, a second group of brushes lying above the first group and comprising a plurality of elongated spiral brush members of larger diameter than the brush members of the first group and each disposed with its longitudinal axis lying in a vertical plane passing between a pair of brushes of the first group, the spirals of the brushes of the second group being alternately of opposite hand, the brushes of said groups being supported for rotation, a driving pulley operatively connected with each of the brushes of each group, said driving pulleys all being disposed upon one side of the box, alternate ones of the driving pulleys for the brushes of the first group being of different diameter from the remaining pulleys of the same group, a single driving belt operatively connected with all of the said pulleys of the two groups to effect the rotation of all of the brushes of the first group in one direction and the rotation of all of the brushes of the second group in one direction and oppositely to the brushes of the first group, a receiver connected with the bottom of said box, a blower connected with said receiver to extract material from the receiver, a motor operatively coupled with the blower, and an operative coupling between said motor and a brush of one of the groups for imparting rotary motion to the said brush.

RAYMOND PEEPLES.